United States Patent
Huang et al.

(10) Patent No.: US 7,119,856 B2
(45) Date of Patent: Oct. 10, 2006

(54) TV DECODER

(75) Inventors: Chien-Hsiu Huang, Hsinchu (TW); Hung-Ta Pai, Taichung Hsien (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 603 days.

(21) Appl. No.: 10/146,036

(22) Filed: May 16, 2002

(65) Prior Publication Data

US 2003/0107683 A1 Jun. 12, 2003

(30) Foreign Application Priority Data

Dec. 10, 2001 (TW) .............................. 90130529 A

(51) Int. Cl.
*H04N 5/44* (2006.01)
*H04N 5/455* (2006.01)

(52) U.S. Cl. ...................... 348/725; 348/726
(58) Field of Classification Search ........ 348/725–727; H04N 5/44, 5/455
See application file for complete search history.

(56) References Cited

U.S. PATENT DOCUMENTS

| | | | | |
|---|---|---|---|---|
| 5,504,684 A | * | 4/1996 | Lau et al. ................... | 455/3.02 |
| 5,978,036 A | * | 11/1999 | Higa et al. .................. | 348/468 |
| 6,133,964 A | * | 10/2000 | Han ........................... | 348/726 |
| 6,351,293 B1 | * | 2/2002 | Perlow ....................... | 348/726 |
| 6,356,598 B1 | * | 3/2002 | Wang .......................... | 375/321 |
| 6,381,236 B1 | * | 4/2002 | Miyashita et al. .......... | 370/343 |
| 6,396,548 B1 | * | 5/2002 | Gornstein et al. .......... | 348/725 |
| 6,445,423 B1 | * | 9/2002 | Bouillet et al. ............. | 348/537 |
| 6,490,007 B1 | * | 12/2002 | Bouillet et al. ............. | 348/614 |
| 6,529,558 B1 | * | 3/2003 | Fimoff et al. ............... | 375/262 |
| 6,639,939 B1 | * | 10/2003 | Naden et al. ............... | 375/140 |
| 6,678,010 B1 | * | 1/2004 | Jun ............................. | 348/678 |
| 6,678,310 B1 | * | 1/2004 | Andren et al. .............. | 375/147 |
| 6,707,861 B1 | * | 3/2004 | Stewart ....................... | 375/321 |
| 6,728,524 B1 | * | 4/2004 | Yamanaka et al. ........ | 455/232.1 |
| 6,779,069 B1 | * | 8/2004 | Treichler et al. ........... | 710/305 |
| 6,917,655 B1 | * | 7/2005 | Fimoff et al. ............... | 375/265 |
| 2001/0010563 A1 | * | 8/2001 | Jun ............................. | 348/678 |
| 2003/0142764 A1 | * | 7/2003 | Keevill et al. .............. | 375/341 |

* cited by examiner

*Primary Examiner*—Brian P. Yenke
(74) *Attorney, Agent, or Firm*—Birch, Stewart, Kolasch & Birch, LLP

(57) ABSTRACT

A TV decoder. The decoder comprises a converter producing a plurality of first bits by sampling a base-band TV signal within a sampling period, and transmitting the first bits in groups, wherein the first bits in each one of the groups undergo parallel transmission through a plurality of first signals, and a demodulator receives the first bits and produces a plurality of second bits controlling the first signals, wherein the second bits are sequentially transmitted through a second signal input to the converter.

6 Claims, 4 Drawing Sheets

TV DECODER

BACKGROUND OF THE INVENTION

1. Field of the Invention

The present invention relates to a TV decoder, particularly to a TV decoder having a demodulator disposed in a graphic card and separated from an ADC.

2. Description of the Prior Art

FIG. 1 is a diagram showing a conventional TV decoder. A tuner 11 receives an RF-band TV signal RFTS and outputs a base-band TV signal BTS to a TV decoder chip 12. The TV decoder chip 12 has an analog-to-digital converter(ADC) 111 receiving the signal RFTS and produces image data bits by sampling the signal RFTS, and a demodulator 112. The image data bits are transmitted through signal DS to the demodulator 112. The demodulator 112 also producing control data bits transmitted through signal CS to the ADC 111. The signal CS carrying the control data bits controls a DC level and gain of the signal DS. Finally, the demodulator 112 produces a video signal VD to be processed by a graphic card 13.

In the previously described TV decoder 12, the ADC 111 and demodulator 112 are disposed on the same chip so that the TV decoder chip 12 is an external device connected to the graphic card 13 by a feature connector (not shown) and the transmission of the bits carried by the signals DS and CS is simply parallel.

However, it is costly to manufacture the TV decoder chip 12 having both of the ADC 111 and demodulator 112 since their manufacture processes are totally different. For the sake of cost, it is better to separate the demodulator 112 from the ADC 111, put it into the graphic card 13 and connect the ADC 111 to the graphic card 13 by the feature connector. Unfortunately, a large number of pins are needed between the ADC 111 and graphic card 13 due to the simply parallel transmission of the bits carried by the signals DS and CS, which is not compatible with the pin number of the feature connector.

SUMMARY OF THE INVENTION

Therefore, the object of the present invention is to provide a TV decoder having the demodulator disposed in the graphic card and separated from the ADC. The number of pins for signal transmission between the ADC and demodulator is reduced to be compatible with the pin number of the feature connector.

The present invention provides a TV decoder. The TV decoder comprises a converter producing a plurality of first bits by sampling a base-band TV signal within a sampling period, and transmitting the first bits in groups, wherein the first bits in each one of the groups undergo parallel transmission through a plurality of first signals, and a demodulator receives the first bits and produces a plurality of second bits controlling the first signals, wherein the second bits are sequentially transmitted through a second signal input to the converter.

Thus, in the invention, the techniques of clock doubling, double triggering and time sharing make it possible for a large number of bits between the ADC and demodulator to be transmitted through a small number of pins of the feature connector.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description, given hereinbelow and the accompanying drawings, which are given by way of illustration only, and thus are not limitative of the present invention, and in which.

DETAILED DESCRIPTION OF THE INVENTION

Figure 1:
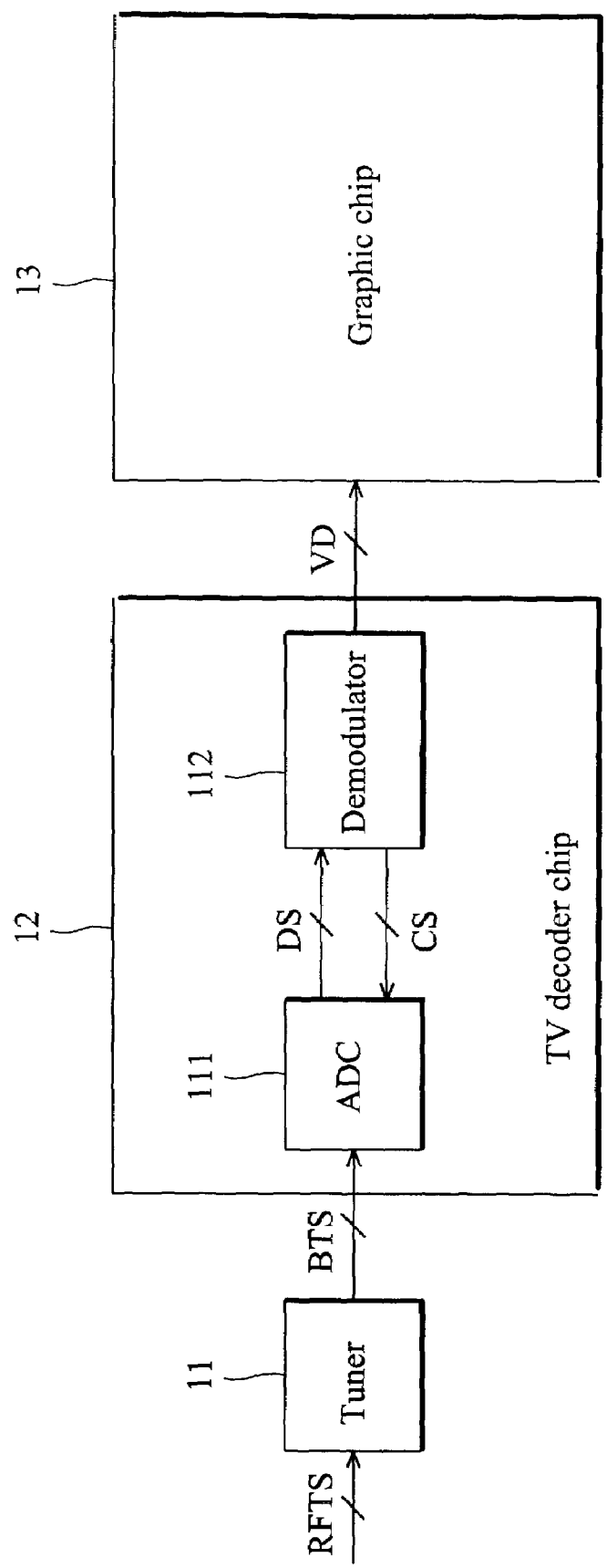
FIG. 1 is a diagram showing a conventional TV decoder.
Figure 2:
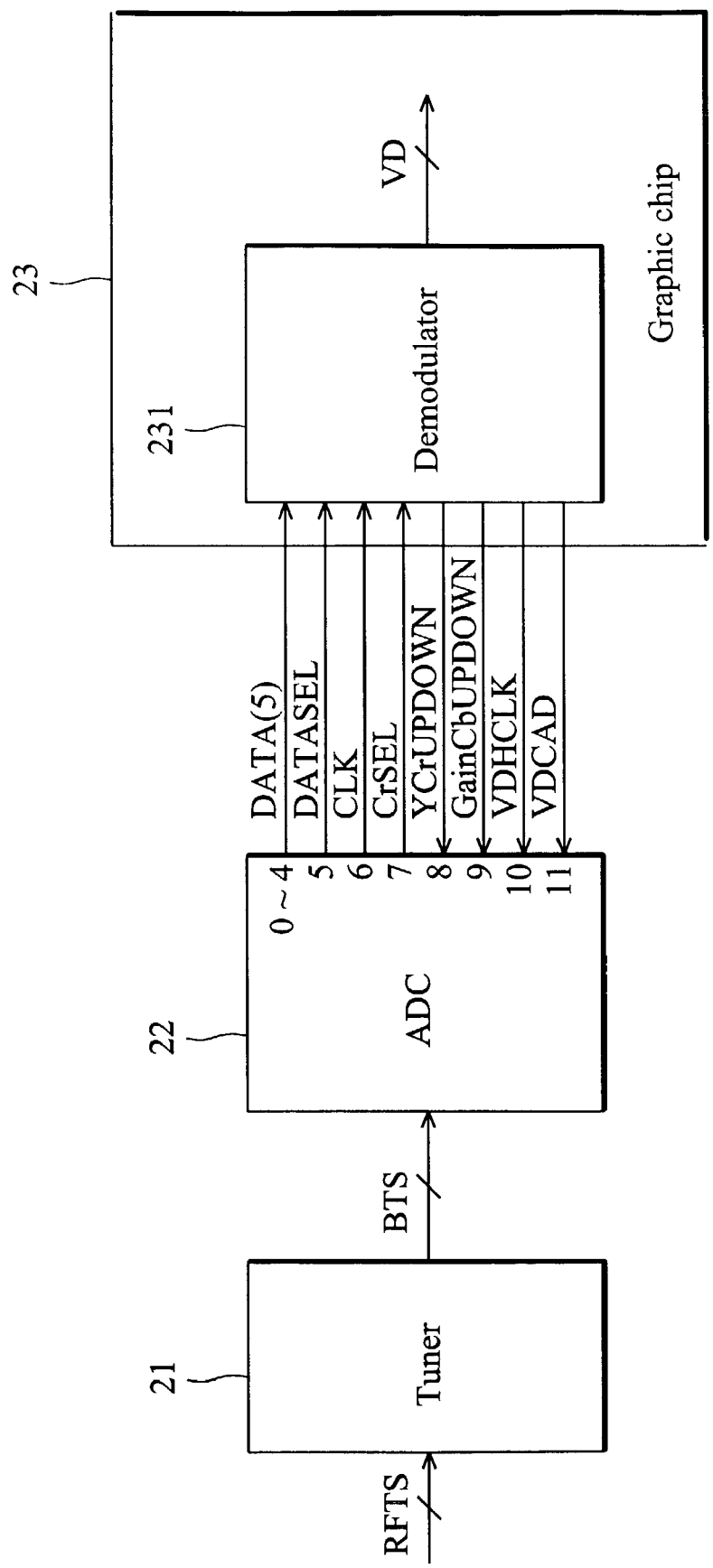
FIG. 2 is a diagram showing a TV decoder according to one embodiment of the invention.

FIG. 2 is a diagram showing a TV decoder according to one embodiment of the invention. A tuner 21 receives a RF-band TV signal RFTS and outputs a base-band TV signal BTS to a 10-bit ADC 22. The ADC 22 receives the signal RFTS, and produces image data bits by sampling the signal RFTS at a sampling rate. The image data bits are transmitted through 5 image data signals DATA on 5 pins 0~4 to a demodulator 231 in a graphic card 23. The image data bits obtained within one sampling period are transmitted in groups and the bits in each one of the groups undergo parallel transmission through the 5 data signals DATA on the rising and falling edges of the clock signal CLK. That is to say, the ADC 22 transmits the groups of the image data bits at a data rate four times the sampling rate. Accompanied by the image data signals DATA, the ADC 22 also produces a clock signal CLK with a frequency of twice the sampling rate, a data selection signal DATASEL, and a constituent data selection signal CrSEL on pins 5, 6 and 7 respectively. They are also transmitted to the demodulator 231. The demodulator 231 produces control data bits transmitted through control signals YCrUPDOWN and GainCbUPDOWN on pins 8 and 9 to the demodulator 231. The control data bits carried by the signals YCrUPDOWN and GainCbUPDOWN control the DC level and gain of the image data signals DATA. In addition to the signals YCrUPDOWN and GainCbUPDOWN, the demodulator 231 also produces signals VDHCLK and VDCAD transmitted to the ADC 22 on pins 10 and 11. The signals VDHCLK and VDCAD are used to set some programmable features of the ADC 22 such as the sampling rate. Finally, the demodulator 231 produces a video signal VD to be further processed by the graphic card 23.

There are three types of base-band TV signal BTS; composite TV signal, S TV signal comprising constituent signals Y and C, and component TV signal comprising constituent signals Y, Cr and Cb. The number of image data bits produced by the 10-bit ADC 22 within a sampling period depends on the type of the TV signal. For the composite TV signal, the number of image data bits produced within a sampling period is 10. For the S TV signal, the number is 20 wherein 10 bits are produced by sampling the constituent signal Y and the other 10 bits are produced by sampling the constituent signal C. For the component TV signal, the number is 30 wherein 10 bits are produced by sampling the constituent signal Y, another 10 bits are produced by sampling the constituent signal Cr and the other 10 bits are produced by sampling the constituent signal Cb.

Figure 3:
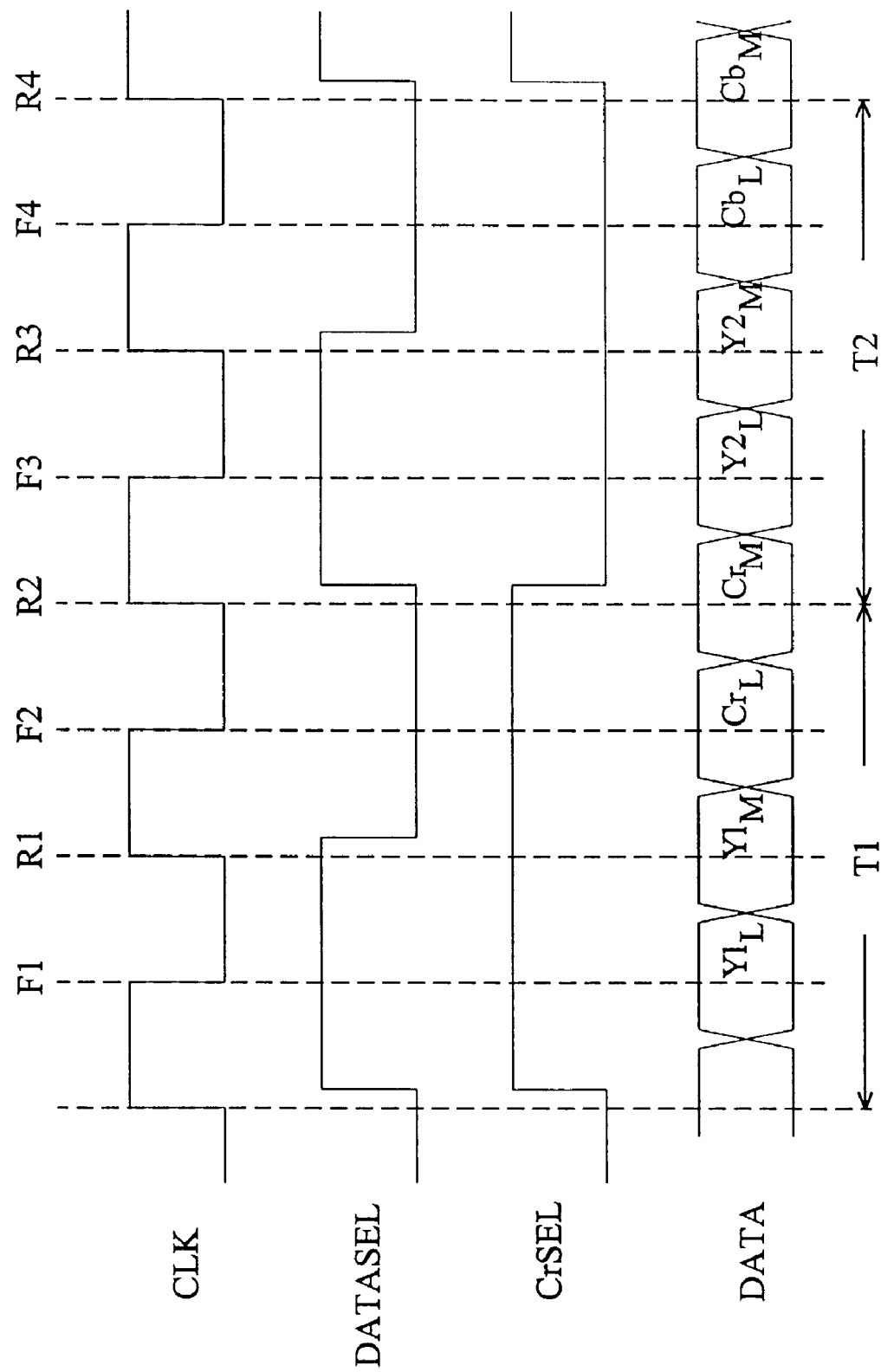
FIG. 3 is a diagram showing the timing of the image data and clock signals transmitted between the ADC and demodulator of a TV decoder according to one embodiment of the invention.

The timing of the signals DATA, DATASEL, CLK and CrSEL for the component TV signal will be explained in conjunction with FIG. 3.

In the sampling period T1:

Upon the falling edge F1 of the clock signal CLK, the 5 DATA signals on the pins 0~4 carrying the 5 least bits $Y1_L$ of the image data bits produced in the sampling period T1 are transmitted to the demodulator 23. Both of the signals DATASEL and CrSEL have a high logic level, which indicates that the bits carried by the DATA signals are those produced by sampling the constituent signal Y.

Upon the rising edge R1 of the clock signal CLK, the 5 DATA signals on the pins 0~4 carrying the 5 most significant bits $Y1_M$ of the image data bits produced in the sampling period T1 are transmitted to the demodulator 23. Both of the signals DATASEL and CrSEL have a high logic level, which indicates that the bits carried by the DATA signals are those produced by sampling the constituent signal Y.

Upon the falling edge F2 of the clock signal CLK, the 5 DATA signals on the pins 0~4 carrying the 5 least bits $Cr_L$ of the image data bits produced in the sampling period T1 are transmitted to the demodulator 23. The signals DATASEL and CrSEL have a low and high logic level respectively, which indicates that the bits carried by the DATA signals are those produced by sampling the constituent signal Cr.

Upon the rising edge R2 of the clock signal CLK, the 5 DATA signals on the pins 0~4 carrying the 5 most significant bits $Cr_M$ of the image data bits produced in the sampling period T1 are transmitted to the demodulator 23. The signals DATASEL and CrSEL have a low and high logic level respectively, which indicates that the bits carried by the DATA signals are those produced by sampling the constituent signal Cr.

In the sampling period T2:

Upon the falling edge F3 of the clock signal CLK, the 5 DATA signals on the pins 0~4 carrying the 5 least bits $Y2_L$ of the image data bits produced in the sampling period T2 are transmitted to the demodulator 23. The signals DATASEL and CrSEL have a high and low logic level respectively, which indicates that the bits carried by the DATA signals are those produced by sampling the constituent signal Y.

Upon the rising edge R3 of the clock signal CLK, the 5 DATA signals on the pins 0~4 carrying the 5 most significant bits $Y2_M$ of the image data bits produced in the sampling period T2 are transmitted to the demodulator 23. The signals DATASEL and CrSEL have a high and low logic level respectively, which indicates that the bits carried by the DATA signals are those produced by sampling the constituent signal Y.

Upon the falling edge F4 of the clock signal CLK, the 5 DATA signals on the pins 0~4 carrying the 5 least bits $Cb_L$ of the image data bits produced in the sampling period T2 are transmitted to the demodulator 23. Both of the signals DATASEL and CrSEL have a low logic level, which indicates that the bits carried by the DATA signals are those produced by sampling the constituent signal Cb.

Upon the rising edge R4 of the clock signal CLK, the 5 DATA signals on the pins 0~4 carrying the 5 most significant bits $Cb_M$ of the image data bits produced in the sampling period T2 are transmitted to the demodulator 23. Both of the signals DATASEL and CrSEL have a low logic level, which indicates that the bits carried by the DATA signals are those produced by sampling the constituent signal Cb.

Thus, the image data bits obtained by sampling the base-band TV signal BTS in the continuously repeated sampling period T1 and T2 are transmitted to the demodulator 23 in the way described previously. It is noted that the bits produced by sampling the constituent signal Cr are transmitted alternatively with the bits produced by sampling the constituent signal Cb in the sampling period T2. That is to say, the video signal VD is a video signal of a 4:2:2 format.

For the S TV signal, the timing of the signals DATA, DATASEL, CLK and CrSEL is the same as that for the component TV signal except that the signal CrSEL always has a high logic level, which indicates there is no bit produced by sampling the constituent signal Cb, and that the sampling period T2 is only used for the transmission of the bits produced by sampling the constituent signal C.

For the composite TV signal, the timing of the signals DATA, DATASEL, CLK and CrSEL is the same as that for the component TV signal except that both signal CrSEL and DATASEL always have a high logic level, which indicates there are only bits produced by sampling the single composite signal, and no bit is transmitted in the sampling period T2.

In this embodiment, the ADC 22 is a 10-bit ADC with the data rate four times the sampling rate and transmits at most 20 bits through 5 data signals within one sampling period. However, the numbers of the data signals and the bits transmitted within one sampling period are not limited to 5 and 20. They can be chosen to be any proper number as long as a ratio of the number of the bits to that of the data signals is equal to a ratio of the data rate to the sampling rate.

Figure 4:
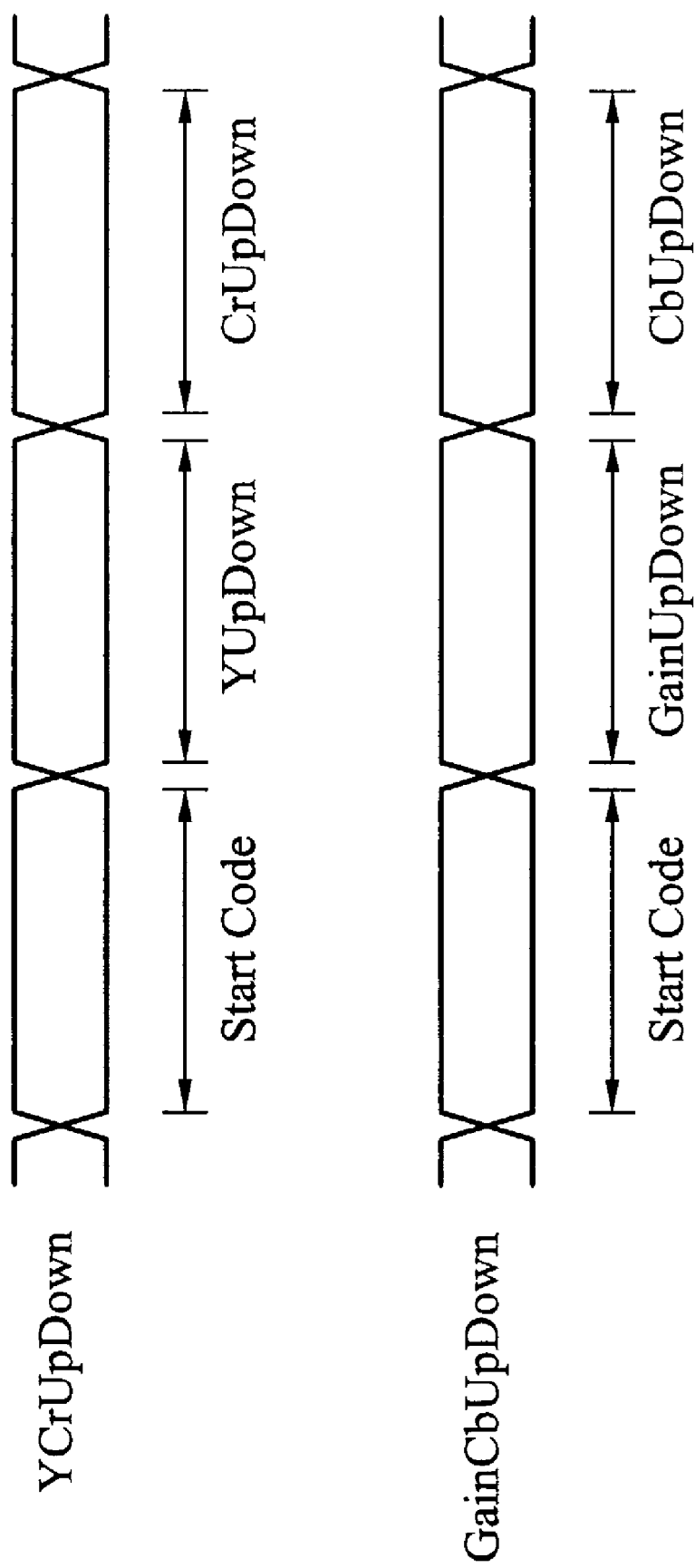
FIG. 4 is a diagram showing the timing of the control data signals transmitted between the ADC and demodulator of a TV decoder according to one embodiment of the invention.

The timing of the signals YCrUPDWN and GainCbUPDOWN for the component TV signal will be explained in conjunction with FIG. 4.

The signal YCrUPDOWN carries bits of a start code and two alternately transmitted control data YUPDOWN and CrUPDOWN. The signal GainCbUPDOWN carries bits of a start code and two alternately transmitted control data GainUPDOWN and CbUPDOWN. The bits of the control data YUPDOWN, CbUPDOWN and CrUPDOWN are for DC restoration of the data signals DATA carrying the bits produced by sampling the constituent signal Y, Cb and Cr respectively. Each of the control data YUPDOWN, CbUPDOWN and CrUPDOWN has 8 bits wherein the first bit indicates the polarity of a adjustment value and the other 7 bits indicate the adjustment value. The control data GainUPDOWN also has 8 bits and controls the gain of the data signals. The gain rages from ½ to 2.

For the S TV signal, the timing of the signals YCrUPDWN and GainCbUPDOWN is the same as that for the component TV signal except for there is no control data CbUPDOWN and the control data CrUPDOWN is used for the constituent signal C.

For the composite TV signal, the timing of the signals YCrUPDWN and GainCbUPDOWN is the same as that for the component TV signal except there is no control data CbUPDOWN and CrUPDOWN, and the control data YUPDOWN is used for the single composite TV signal.

Since the signals VDHCLK and VDCAD are simply transmitted through the two pins 10 and 11 respectively, no further explanation will be made for them.

Consequently, in the invention, the techniques of clock doubling (making the frequency of the clock signal twice the sampling rate), double triggering (transmitting the data bits upon the falling and rising edges of the clock signal) and time sharing (alternately transmitting two control data through one control signal) make it possible for a large number of bits between the ADC and demodulator to be transmitted through only the 12 pins of the feature connector. The demodulator is separated from the ADC, put into the graphic card and connected to the ADC by the feature connector. This reduces the manufacture cost of the TV decoder.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A demodulator connecting to a N-bits analog-to-digital converter, comprising:

$$\frac{N}{2}$$

data pins receiving data signals from the N-bits analog-to-digital converter;
  a first clock pin receiving a first clock signal from the N-bits analog-to-digital converter;
  a first select pin receiving a first control signal from the N-bits analog-to-digital converter;
  a second select pin receiving a second control signal from the N-bits analog-to-digital converter to select a data signal type with the first control signal;
  a second clock pin transmitting a second clock signal to the N-bits analog-to-digital converter;
  a data select pin transmitting a data control signal to set up the N-bits analog-to-digital converter with the second clock signal;
  a gain control pin transmitting a gain control signal to adjust the dc gain of the N-bits analog-to-digital converter; and
  a voltage level control pin transmitting a voltage level control signal to adjust the voltage level of the N-bits analog-to-digital converter.

2. The demodulator of claim 1, wherein N is equal to 10.

3. The demodulator of claim 1, wherein the demodulator is formed on a TV decoder chip.

4. The demodulator of claim 3, wherein the TV decoder chip is formed on a graphic chip.

5. A method for transmitting signals between an N-bits analog-to-digital converter and a demodulator, comprising:
  providing a N-bits analog-to-digital converter having $$\frac{N}{2}$$

data signals, a data select signal, a clock signal and a data type select signal;
  providing a demodulator receiving a N bits data from the N-bits analog-to-digital converter, wherein the N bits data comprises a first data and a second data;
  when the clock signal, the data select signal and the data type select signal are at a logic high level, the N-bits analog-to-digital converter transmits the $$\frac{N}{2}$$

least significant bits of the first data to the demodulator;
  when the clock signal is at a logic low level and the data select signal and the data type select signal are at a logic high level, die N-bits analog-to-digital converter transmits the $$\frac{N}{2}$$

most significant bits of the first data to the demodulator;
  when the clock signal and the data type select signal are at a logic high level and the data select signal is at a logic low level, the N-bits analog-to-digital converter transmits the $$\frac{N}{2}$$

least significant bits of the second data to the demodulator; and
  when the clock signal and the data select signal are at a logic low level and he data type select signal is at a logic high level, the N-bits analog-to-digital converter transmits the $$\frac{N}{2}$$

most significant bits of the second data to the demodulator.

6. The method of claim 5, wherein N is equal to 10.

* * * * *